April 26, 1932. C. J. DUDLEY 1,855,825
BASKET HANDLE
Filed Jan. 23, 1930
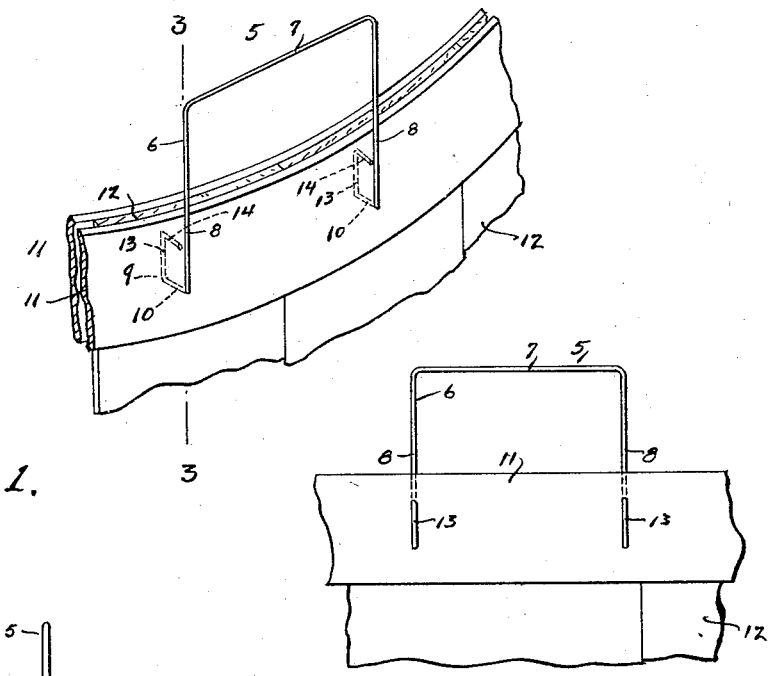
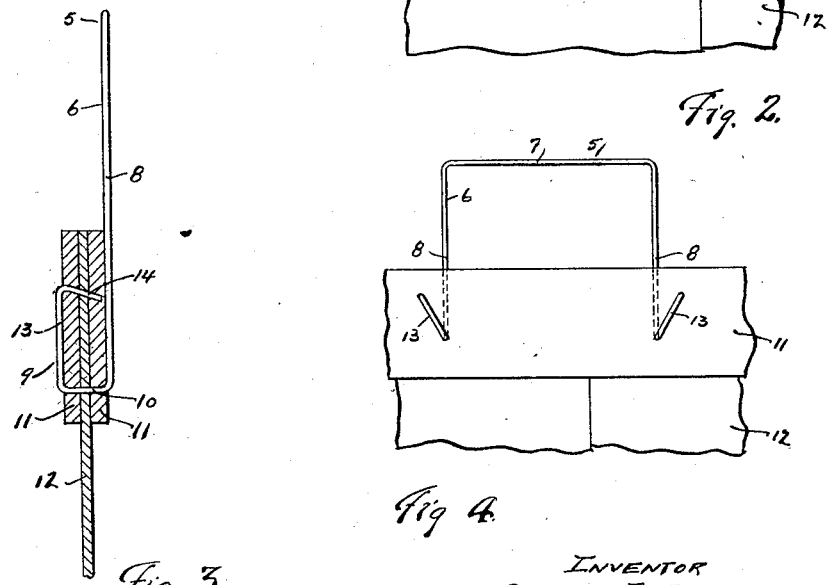
Inventor
COLON J. DUDLEY
By
Attorney Patented Apr. 26, 1932

1,855,825

UNITED STATES PATENT OFFICE

COLON J. DUDLEY, OF HAMBURG, NEW YORK

BASKET HANDLE

Application filed January 23, 1930. Serial No. 422,919.

My invention relates in general to basket handles, and in particular to a wire handle for use upon wooden bushel baskets.

It is well known to those skilled in the art that such wire handles at present in use have the lower ends passed through the hoops at the upper end of the basket and are turned upwardly on the inside. With such a construction, when the handle is bent outwardly as in the handling of the basket, the handle is thus forced away from the inner ends causing them to separate or be spread apart from the handle. When the handle is now brought to a vertical position as in lifting the basket with its contents, the inner distorted ends are thus moved inwardly and project beyond the inner face of the inner hoop of the basket where they will injure the fruit to a degree depending upon the amount of distortion.

It has been an object of my invention to provide a handle which shall have its inner upturned ends firmly secured in the hoops of the basket, so that even though the handle is bent outwardly and inwardly, the inner ends shall not project within the basket.

Another object has been to provide a handle which is easily applied and one which adds to the strength of the basket hoops.

The above objects and advantages have been accomplished by the device shown in the accompanying drawings, of which:

Fig. 1 is a fragmentary, perspective view of the upper end of a bushel basket with my invention applied thereto.

Fig. 2 is an inner face view of the same.

Fig. 3 is an enlarged, sectional view taken on line 3—3 of Fig. 1.

Fig. 4 is a modification of the invention.

My invention comprises a handle 5 made of wire 6 and of inverted U-bight form, and having a horizontal member 7 and two vertical members 8. The lower ends 9 of the vertical members 8 are provided with a right-angle bent portion 10 which passes through the hoops 11 and upper ends of the staves 12 of the basket. A return-bend portion 13 is then formed on each end, the extreme upper end of which is formed in an inwardly bent locking portion 14. This locking portion is preferably arranged at an angle with the portion 13 which is greater or less than a right angle, but preferably less than a right angle, so that when driven into the hoops and staves, it will be locked therein. When the locking portion is less than a right angle, it will have a clinching action upon the hoops. After the end 14 has been forced into the hoops and staves, the return-bend portion 13 will be held firmly against the inner face of the inner hoop 11 of the basket, and no amount of bending of the handle 5 will affect its position.

As shown in Figs. 1 to 3, the return-bend portions 13 may lie in planes parallel to each other, or they may be bent outwardly away from each other, as shown in the modified form of Fig. 4, or, reversely, inwardly toward each other (not shown).

Thus, my invention overcomes the disadvantages characteristic of the previous types of handles hereinbefore referred to. Moreover, my invention provides a basket handle which is not only strong in itself, but adds to the strength of the basket hoops, and being simple in construction, can be easily applied and cheaply manufactured.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A handle for baskets made of wire in inverted U-shape, having its lower ends passed inwardly through the rim of the basket, return-bend portions extending upwardly on the inside of the basket, and a locking portion carried by each return-bend portion, bent at an angle to the vertical portion of the handle and embedded in the basket rim, the U-bight portion of the handle extending above and on the outside of the rim, thereby maintaining the top edge of the basket rim free of obstructions of cross wires.

2. A handle for baskets made of wire in inverted U-shape, having its lower ends passed inwardly through the rim of the basket, return-bend portions extending upwardly on the inside of the basket, and a locking portion carried by each return-bend portion and angularly embedded in the basket rim, the U-bight portion of the handle extending above and on the outside of the rim, thereby maintaining the top edge of the basket rim free of obstructions of cross wires.

In testimony whereof, I have hereunto signed my name.

COLON J. DUDLEY.